United States Patent Office 2,829,157
Patented Apr. 1, 1958

2,829,157
NOVEL HYDANTOIC ACIDS AND THEIR ALKYL ESTERS

Leonard L. McKinney, Peoria, Ill., assignor to the United States of America as represented by the Secretary of Agriculture No Drawing. Application March 10, 1953
Serial No. 341,624

3 Claims. (Cl. 260—482)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to novel hydantoic acids, hydantoic acid esters and hydantoins obtained by reacting aliphatic isocyanates containing at least 10 carbon atoms in the aliphatic chain with alpha-amino acids. It relates also to the novel hydantoic acid and hydantoins obtained by the use of alpha-amino acid esters and the N-2-carboalkoxyethyl derivatives of alpha-amino acids.

The hydantoic acids of this invention are readily converted to hydantoins by heat or by treatment with acids.

My new compounds are white solids and possess melting points generally below 100° C. They are sparingly soluble in water but are soluble in organic solvents. They have been found to be effective as a class in lowering the surface tension of water, probably by virtue of their distinctive molecular structure, i. e. the long hydrocarbon chain atttached to a highly polar group.

The products have the following general structural formula:

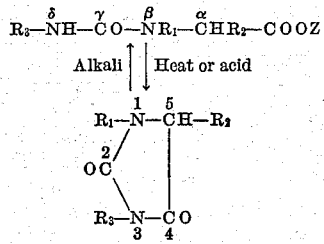

In the foregoing formulae substituent $R_1$ is hydrogen or $CH_2CH_2COOZ$, $R_2$ is hydrogen, methyl, isobutyl, secondary butyl, or 2-methylthioethyl, $R_3$ is an aliphatic radical containing at least 10 carbon atoms, such as octadecyl, and Z is hydrogen or an alkyl radical.

Isocyanates are known to react with amino acids to produce hydantoic acids, which in turn may be converted to hydantoins. The reactions occur according to the following equations:

$$RNCO + NH_2CH_2COOH \longrightarrow RNHCONHCH_2COOH$$

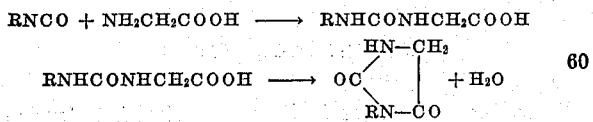

Phenyl isocyanate is known to take part in this type of transformation, and 3-phenyl hydantoin is a known compound. Because of its rapid reaction with water, the reaction with phenyl isocyanate must be carried out in nonaqueous media such as pyridine.

In contrast to known hydantoins and hydantoic acids such as for example delta-phenyl hydantoic acid, the novel products of this invention have the distinctive property of reducing the surface tension of water. Furthermore, the carboxyethyl group in some of my new compounds (i. e. where $R_1$ is $CH_2CH_2COOH$) increases their utility by imparting increased water solubility, especially in alkaline solutions.

This invention will be described hereinafter with special reference to the octadecyl member, it being understood that other long chain aliphatic radicals may be substituted in the formulae by employing the corresponding isocyanate for the synthesis of the hydantoic acid; for example, hexadecyl isocyanate or dodecyl isocyanates may be substituted for the octadecyl isocyanate in the examples of this specification. I have discovered that long chain aliphatic isocyanates may be reacted with alpha-amino acids in aqueous alkaline solutions to give yields of 50 to 70 percent of the corresponding hydantoic acid or hydantoin, depending on the method of isolation, i. e. whether under alkaline conditions or by means of heat or acid as illustrated in Example 2 below. The reaction may also be carried out by fusing the amino acid with the isocyanate at temperatures of about 100° to 120° C. This latter method affords yields of 85 to 95 percent.

The amino acid compounds which are reacted in accordance with this invention have the following general formula:

$$HNR_1CHR_2COOH$$

in which $R_1$ is hydrogen or $CH_2CH_2COOZ$, $R_2$ is hydrogen, methyl, isobutyl, secondary butyl, or 2-methylthioethyl, and Z is hydrogen or an alkyl radical.

Compounds included in the group are the N-2-carboalkoxyethyl derivatives of alpha-amino acids described in U. S. Patent No. 2,607,797.

When reacting the long chain isocyanates with an N-substituted amino acid as shown in Examples 3, 4 and 5 below, the esters are preferred because of the reduced reactivity of the amino group. Often it is necessary to warm the reaction mixture to initiate the reaction which then becomes exothermic and continuous without further heating. When esters are employed, saponification or hydrolysis must be used to obtain the free acids or hydantoins. The reaction sequence is illustrated as follows:

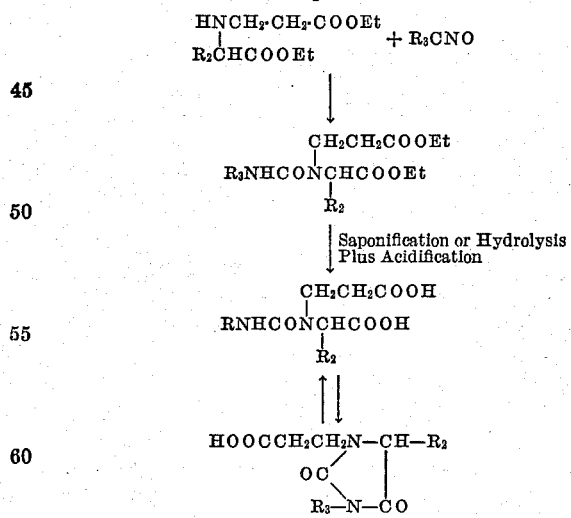

in which $R_1$, $R_2$, and $R_3$ have the same values as given above. The esters obtained prior to saponification are very insoluble in water but readily soluble in organic solvents. They have potential applications as plasticizers.

Because of the insolubility of my products in neutral and acidic aqueous solutions, the unreacted amino acids present in the reaction products were readily extracted with water in the presence of a little acid such as hydrochloric acid. The resulting crude preparations were usually found to be contaminated with a small amount of N,N'-diR₃ substituted urea which was left behind on dissolving the hydantoic acids in aqueous alkali.

The following examples illustrate the invention:

Example 1

Leucine (0.10 mole, 13.1 grams) was placed in 50 cc. of water and the pH adjusted to 9.8 with sodium hydroxide after which the volume of the solution was adjusted to 60 cc. Octadecyl isocyanate (0.10 mole, 28.0 grams) was added and the temperature of the reaction mixture was held at 80° C. for 10 hours while stirring. The reaction mixture became a gel within 3 hours and water was added to give a volume of 400 cc. At the end of the 10 hours, the reaction mixture was acidified to pH 1.5 with hydrochloric acid and a precipitate was obtained. The precipitate (28.8 grams) was removed by filtration for a yield of 70 percent of the crude product. This crude product melted at 82° to 85° C. and contained 5.95 percent nitrogen. Upon crystallization from 90 percent ethanol, the melting point was 78 to 79° C., the nitrogen content was 6.55 percent (calcd. 6.57 percent), and the neutral equivalent was 425 (calcd. 426) which agreed with that calculated for delta-octadecyl, alpha-(2-methylpropyl)-hydantoic acid. The product had the formula:

CH₃(CH₂)₁₇NHCONHCHCOOH
|
CH₂CH(CH₃)CH₃

The filtrate was adjusted to pH 5.5, the isoelectric point of leucine, and no precipitation occurred indicating that all of the leucine had reacted. Additional amounts of the above product were then recovered by evaporating to dryness and crystallizing from ethanol.

Example 2

Freshly prepared leucine ethyl ester (0.05 mole, 8.2 grams) was mixed with octadecyl isocyanate (0.05 mole, 15.3 grams). Heat was evolved, and the reaction mixture soon solidified.

A portion of this solid was crystallized from hot absolute ethanol, and nearly a quantitative yield was obtained consisting of a white solid melting sharply at 76° to 77° C. The nitrogen content was 6.15 percent (calcd. 6.17) agreeing with that for ethyl delta-octadecyl, alpha-(2-methylpropyl)-hydantoate. The product had this formula:

CH₃(CH₂)₁₇NHCONHCHCOOEt
|
CH₂CH(CH₃)CH₃

The remainder of the solid was agitated in 50 cc. of one normal sodium hydroxide to hydrolyze the ester. The mixture was then acidified giving a finely divided precipitate which weighed 21 grams and contained 6.68 percent nitrogen. The product was washed with dilute hydrochloric acid and dried at 60° C. for an overall yield of 92 percent. The nitrogen content was 6.84 percent (calcd. 6.86) which corresponded to that for 3-octadecyl, 5-methylpropyl-hydantoin. The product had the formula:

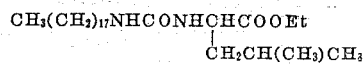

This hydantoin compound was converted to the corresponding hydantoic acid by heating 2.12 grams with 0.005 mole of barium hydroxide octahydrate for 30 minutes. The mixture was neutralized with dilute hydrochloric acid and the precipitate removed. Yield of product was quantitative; N, 6.50 (calcd. for the hydantoic acid 6.57); M. P. 84°–85° C. (Formula is given in Example 1.) This hydantoic acid could be converted back to the hydantoin by warming with dilute hydrochloric acid or by heating in a vacuum oven at 60°–70° C.

An aqueous solution containing 0.25 percent of the hydantoic acid gave a surface tension of 30.5 dynes per sq. cm.

Example 3

Ethyl N-(2-carbethoxyethyl)-alpha-alaninate was prepared as described in Example 3, U. S. Patent 2,607,797. This ester (0.025 mole, 5.3 g.) was mixed with an equivalent amount (7.4 g.) of octadecyl isocyanate in a test tube. The reaction was exothermic and the reaction product solidified on cooling to room temperature. The ester was hydrolyzed by shaking for 2 hours with 50 cc. of one normal sodium hydroxide. The mixture was then acidified with dilute hydrochloric acid and the precipitate removed by filtration. After drying, the nitrogen content was 6.25 percent (calcd. for the hydantoin 6.42 percent, calcd. for the hyantoic acid 6.13 percent). The neutral equivalent was 430 (calcd. for the hydantoin 436). After washing with 3 normal hydrochloric acid, the nitrogen content was 6.45 percent with melting point at 67° to 69° C. and an overall yield of 80 percent. Analyses agreed with that for 1-(2-carboxyethyl), 3-octadecyl, 5-methyl-hydantoin. The product had the formula:

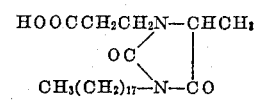

Because of the presence of the carboxyl group, this hydantoin was soluble in alkali, which property enhances its value as a wetting agent. The surface tension of a 1 percent solution of the sodium salt was 36.3 dynes per sq. cm. which value did not change upon the addition of an extra equivalent of alkali.

Example 4

The ethyl N-2-carbethoxyethyl derivatives of mixed alpha-amino acids were prepared as described in Example 2, U. S. Patent 2,607,797. The nitrogen content of this mixture was 5.96 percent indicating an average molecular weight of 233. This mixture (0.25 mole based on the nitrogen content, 5.8 g.) was treated with an equivalent amount of octadecyl isocyanate (7.4 g.). The reaction was exothermic, and after standing a few hours at room temperature the reaction mixture solidified. The solid material was treated with one normal potassium hydroxide to hydrolyze the ester and then acidified with hydrochloric acid. The resulting precipitate was filtered and washed to give a low melting solid with a nitrogen content of 5.35 percent. This crude product was purified by extracting with one normal sodium hydroxide containing 10 to 20 percent ethanol. The insoluble material was removed and was found to contain 4.4 percent nitrogen indicating that it was N,N'-dioctadecyl urea (calcd. 4.97). The filtrate was acidified to pH 2.2 with one normal hydrochloric acid giving a soft, white precipitate which hardened after standing 1 hour in the refrigerator and was removed by filtration. The nitrogen content of this purified product was 5.60 percent which agreed with that for the hydantoic acid (calcd. 5.62). The product had the formula:

CH₂CH₂COOH
|
CH₃(CH₂)₁₇NHCONCHCOOH
|
x where x is a mixture of the iso-butyl radical from leucine, secondary butyl from isoleucine, and 2-methylthioethyl radical from methionine.

Example 5

Ethyl N-(2-carbethoxyethyl)-leucinate was prepared as described in Example 4, U. S. Patent 2,607,797. This ester (0.03 mole, 7.77 g.) was mixed in a dry flask with 0.03 mole (8.85 g.) of octadecyl isocyanate. The flask was warmed to initiate the exothermic reaction. The resulting reaction product was hydrolyzed with alkali and isolated as in Example 4. The nitrogen content was 5.32 percent. Upon purifying by extraction with one normal sodium hydroxide as in Example 4, the nitrogen content was 5.50 (calcd. 5.62) agreeing with the formula for alpha - (2-methylpropyl), beta-N-(2-carboxyethyl), delta-octadecyl-hydantoic acid. The product had the formula:

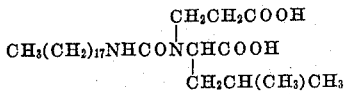

The half sodium salt of this compound dispersed readily in water to give a soapy solution indicating its usefulness as a detergent and wetting agent.

In the foregoing examples, the octadecyl isocyanate may be replaced by other aliphatic isocyanates, as for example hexadecyl isocyanate, dodecyl isocyanate or heptadecyl isocyanate, to produce the corresponding hydantoic acids, esters, or hydantoins having properties analogous to the products of the examples.

It will be seen from the foregoing disclosure that this invention provides novel hydantoic acids, hydantoic acid esters, and the analogous hydantoins, all having novel properties, by reacting long chain aliphatic isocyanates with (1) alpha-amino acids, (2) alpha-amino acid esters, and (3) carboalkoxyethylated alpha-amino acid esters (U. S. Patent 2,607,797). Thus with an amino acid such as leucine the following class of compounds are produced:

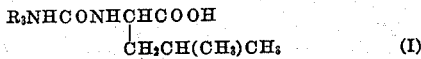  (I)

or

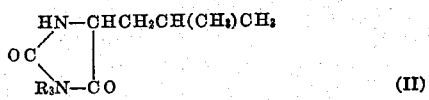  (II)

With leucine alkyl ester, the following class is produced:

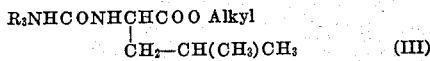  (III)

which may be converted into I by hydrolysis and then into II by acid treatment.

In the case of alanine, the classes are:

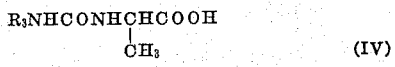  (IV)

and

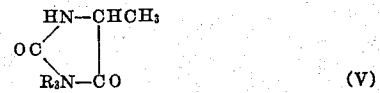  (V)

With an alanine derivative such as alanine alkyl ester or the N-substituted ester; i. e. alkyl N-2-carboalkoxyethyl)-alpha-alaninate, the classes are respectively:

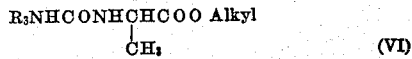  (VI)

which may be converted into IV by hydrolysis and then into V by acid treatment, and:

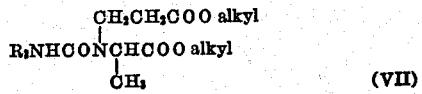  (VII)

which may be converted into the hydantoic acid compound by hydrolysis and then into the corresponding hydantoin by acid treatment.

Further, for alkyl N-(2-carboalkoxyethyl)-leucinate the class is:

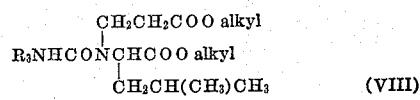  (VIII)

which can be converted into the analogous hydantoic acid by hydrolysis and into the corresponding hydantoin by acid treatment.

I claim:

1. A compound of the formula

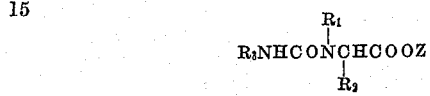

in which $R_1$ is a member of the group consisting of hydrogen and $CH_2CH_2COOZ$, $R_2$ is a member of the group consisting of hydrogen, methyl, isobutyl, secondary butyl, and 2-methylthioethyl, $R_3$ is an aliphatic radical containing at least 10 carbon atoms, and Z is a member of the group consisting of hydrogen and alkyl, each Z being identical to the other.

2. Ethyl alpha-methyl, beta-N-(2-carboxyethyl), delta-octadecyl hydantoate having the formula

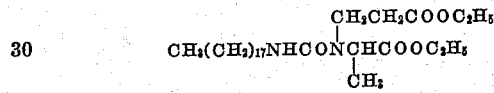

3. Alpha-methyl, beta-N-(2-carboxyethyl), delta-octadecyl hydantoic acid having the formula

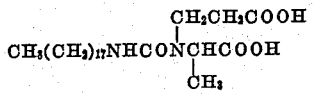

References Cited in the file of this patent

UNITED STATES PATENTS

| | | |
|---|---|---|
| 2,421,233 | Auchincloss et al. | May 27, 1947 |
| 2,561,284 | Long | July 17, 1951 |
| 2,564,648 | Rogers | Aug. 14, 1951 |
| 2,572,568 | Gluesenkamp | Oct. 23, 1951 |
| 2,605,285 | Schultz | July 29, 1952 |
| 2,650,247 | Halpern | Aug. 25, 1953 |
| 2,796,407 | Fields | June 18, 1957 |

OTHER REFERENCES

Shriner et al.: Identification of Org. Compounds, 3rd ed. (1935), p. 155.

Ware: Chemical Reviews, vol. 46, pp. 411 to 413 (1950).

Wagner et al.: Synthetic Organic Chemistry (1953), pp. 168, 416–17.